(12) United States Patent
Yokochi

(10) Patent No.: US 8,390,901 B2
(45) Date of Patent: Mar. 5, 2013

(54) IMAGE READING APPARATUS

(75) Inventor: Atsushi Yokochi, Chiryu (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 478 days.

(21) Appl. No.: 12/698,465

(22) Filed: Feb. 2, 2010

(65) Prior Publication Data

US 2010/0195167 A1    Aug. 5, 2010

(30) Foreign Application Priority Data

Feb. 2, 2009  (JP) ................................ 2009-021620

(51) Int. Cl.
    *H04N 1/04*    (2006.01)
(52) U.S. Cl. ......... 358/474; 358/486; 358/488; 358/493
(58) Field of Classification Search .................. 358/474, 358/486, 488, 493, 497, 487
    See application file for complete search history.

(56) References Cited

U.S. PATENT DOCUMENTS

| | | | | |
|---|---|---|---|---|
| 5,084,611 | A | * | 1/1992 | Okisu et al. ............... 250/208.1 |
| 5,416,609 | A | * | 5/1995 | Matsuda et al. ............ 358/474 |
| 5,764,379 | A | * | 6/1998 | Matsuda et al. ............ 358/474 |
| 5,978,102 | A | | 11/1999 | Matsuda |
| 6,603,582 | B1 | * | 8/2003 | Cotte et al. ................... 358/474 |

FOREIGN PATENT DOCUMENTS

| | | |
|---|---|---|
| JP | 58-130360 | 8/1983 |
| JP | 4-98969 | 3/1992 |
| JP | 6-62184 | 3/1994 |
| JP | 6-334840 | 12/1994 |
| JP | 8-279885 | 10/1996 |
| JP | 9-149207 | 6/1997 |
| JP | 2006-174038 | 6/2006 |
| WO | WO 2005/053307 A1 | 6/2005 |

OTHER PUBLICATIONS

Japanese Office Action dated Nov. 8, 2011 issued in Japanese Patent Application No. 2009-021620, together with English translation.
Japanese Office Action dated Sep. 7, 2010 together with an English language translation.

* cited by examiner

*Primary Examiner* — Houshang Safaipour
(74) *Attorney, Agent, or Firm* — Scully, Scott, Murphy & Presser, PC

(57) ABSTRACT

An image reading apparatus includes: a document table; a light reception unit; light sources disposed such that positions at which the optical axes of the plurality of light sources cross a reception optical axis of the light reception unit are different from one another; and a read control unit. The image reading apparatus further includes: a light reception amount storage unit configured to store the light reception amount for each of distances; a distance calculation unit configured to calculate a distance between the placement surface and the document based on the light reception amount obtained by the read control operation for each light source by referencing the light reception amount stored in the light reception amount storage unit; and a correction amount determination unit configured to determine a correction amount based on the distance calculated by the distance calculation unit.

5 Claims, 17 Drawing Sheets

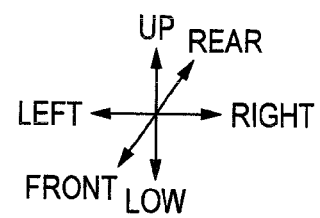
FIG. 1A
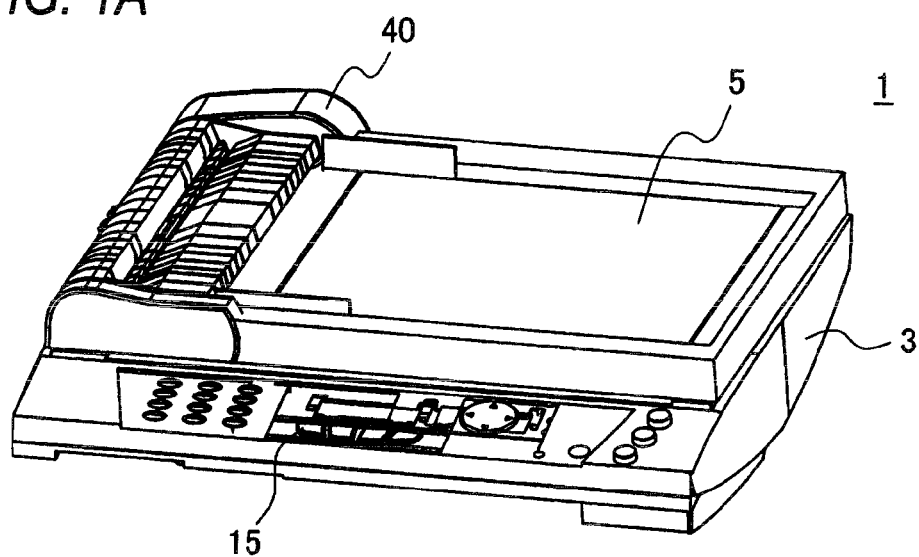
FIG. 1B
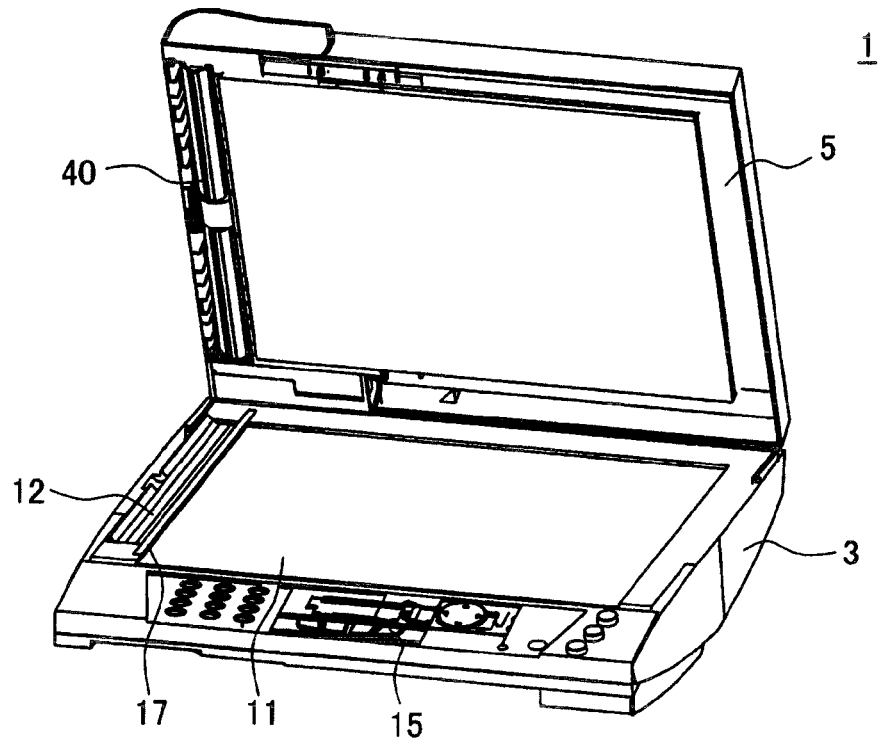

IMAGE READING APPARATUS

CROSS-REFERENCE TO RELATED APPLICATIONS

This application claims priority from Japanese Patent Application No. 2009-021620 filed on Feb. 2, 2009, the entire contents of which are incorporated herein by reference.

TECHNICAL FIELD

The present invention relates to an image reading apparatus configured to read an image of a document placed on a placement surface of a document table, and more particularly to an image reading apparatus including a plurality of light sources such that if a part of the document is spaced from the placement surface because of deformation, etc., of the document, the image can be well read.

BACKGROUND

A known image reading apparatus applies light from a light source to a document placed on a placement surface of a document table and receives reflected light from the document by a light reception unit of a light reception element, etc., thereby reading an image of the document. In this kind of image reading apparatus, if a part of the document is spaced from the placement surface in a height direction (perpendicular to the placement surface) because of deformation, etc., of the document, the light applied from the light source and reflected on the document is not precisely incident on the light reception unit and it may be impossible to read a good image. Then, an image reading apparatus is proposed, in which a plurality of light sources for applying light toward the placement surface along different optical axes are provided such that the optical axes of the light sources cross an optical axis of the light reception unit at different positions, whereby if a part the document is spaced from the placement surface, an image can be well read.

SUMMARY

In the image reading apparatus described above, if a part of the document is spaced from the placement surface, the reflected light from the document is incident on the light reception unit. However, the distance from the placement surface to the document is not detected. If the distance from the placement surface to the document is obtained, various types of correction control such as a correction to the image after read are made possible. It is therefore an object of the invention to provide an image reading apparatus for making possible control of calculating the distance to a document and reflecting it on correction of a read image.

According to an aspect of the invention, there is provided an image reading apparatus comprising: a document table having a placement surface on which a document is allowed to be placed; a light reception unit configured to receive light from a direction of the placement surface, the light reception unit having a reception optical axis; a plurality of light sources configured to apply light toward the placement surface along different optical axes, the plurality of light sources being disposed such that positions at which the optical axes of the plurality of light sources cross the reception optical axis of the light reception unit are different from one another; a read control unit configured to execute a read control operation for each of the plurality of light sources, the read control operation comprising: applying light from each of the plurality of light sources toward the placement surface; and reading a light reception amount of the light reception unit for each of the plurality of light sources; a light reception amount storage unit configured to store the light reception amount of the light reception unit which is obtained, for each of a plurality of distances between the placement surface and a member that reflects the light toward the light reception unit, by applying the light from each of the plurality of light sources; a distance calculation unit configured to calculate a distance between the placement surface and the document based on the light reception amount obtained by the read control operation for each of the plurality of light sources which is executed in a state in which the document is placed on the placement surface, and by referencing the light reception amount stored in the light reception amount storage unit; and a correction amount determination unit configured to determine a correction amount to an image of the document read by using one or more of the plurality of light sources and the light reception unit, based on the distance calculated by the distance calculation unit.

BRIEF DESCRIPTION OF DRAWINGS

FIGS. 1A and 1B are external views of an image reading apparatus according to an embodiment of the invention;

DESCRIPTION

Configuration of Image Reading Apparatus

Figure 2:
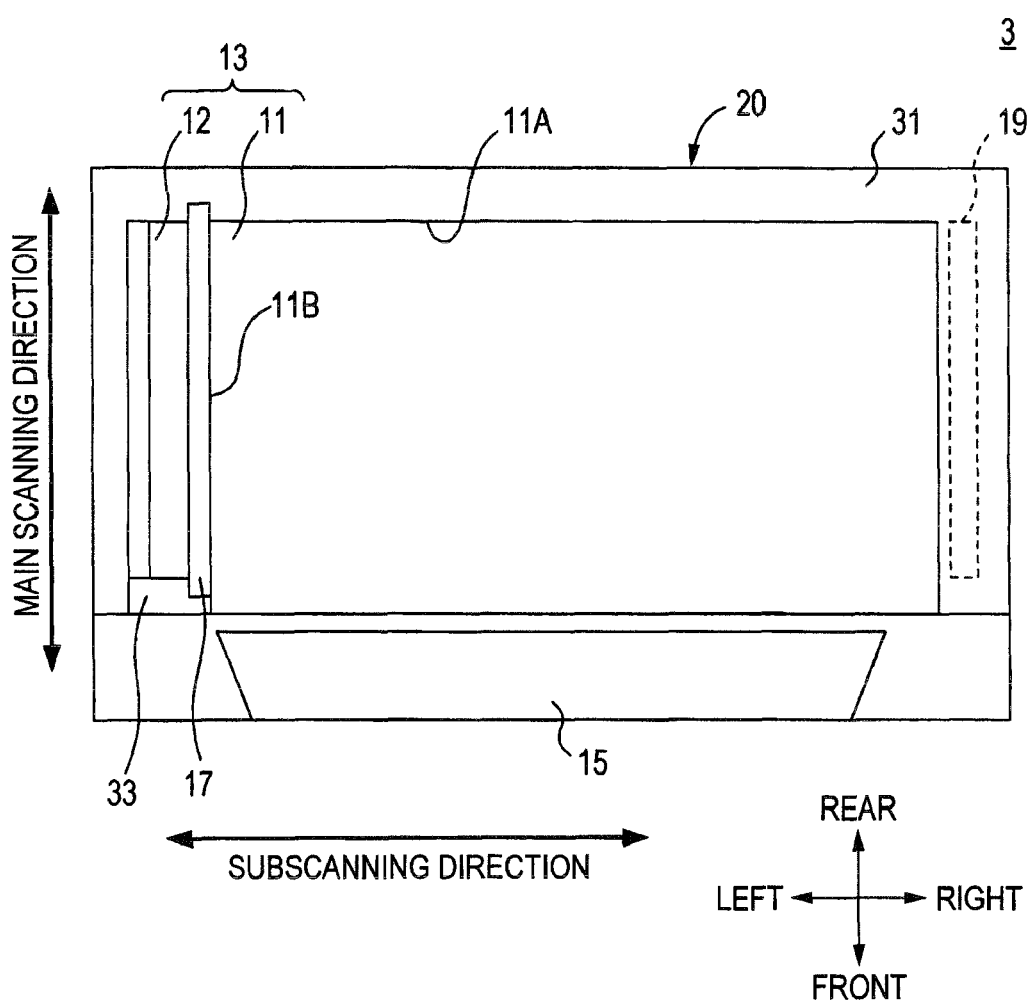
FIG. 2 is a plan view of a main body of the image reading apparatus.

An embodiment of the invention will be discussed with the accompanying drawings.

As shown in FIGS. 1A and 1B, an image reading apparatus 1 of the embodiment is implemented as a scanner of flat bed type. The image reading apparatus 1 includes: a main body 3 including a first read surface 11 and a second read surface 12 provided in an upper portion of the main body 3 which serve as an example of placement surface; and an FB cover 5 as an example of cover movable upward and downward so as to open and close the first and second read surfaces 11 and 12.

As shown in FIG. 1A, the top face of the main body 3 is covered with the FB cover 5 in a state in which the FB cover 5 is closed. FIG. 1A is an external view to represent the configuration of the image reading apparatus 1 with the FB cover 5 closed, and FIG. 1B is an external view to represent the configuration of the image reading apparatus 1 with the FB cover 5 opened. As shown in FIGS. 1A and 1B, the FB cover 5 can be opened and closed with the axis extending in the left-right direction in FIG. 1 as a pivot center.

As shown in FIG. 1, the main body 3 includes an operation unit 15 including various switches on the front. The image reading unit 1 executes processing in response to a command entered by the user through the operation unit 15. Further, as shown in FIG. 2, an edge 11A of the first read surface 11 closer to a hinge of the FB cover 5 (a boundary with a frame body 31) and an edge 11B of the first read surface 11 closer to the second read surface 12 (a boundary with a positioning member 17 described later) form document reference positions used as a placement position reference when a document P (see FIGS. 3A and 3B) is placed.

Figure 3A:
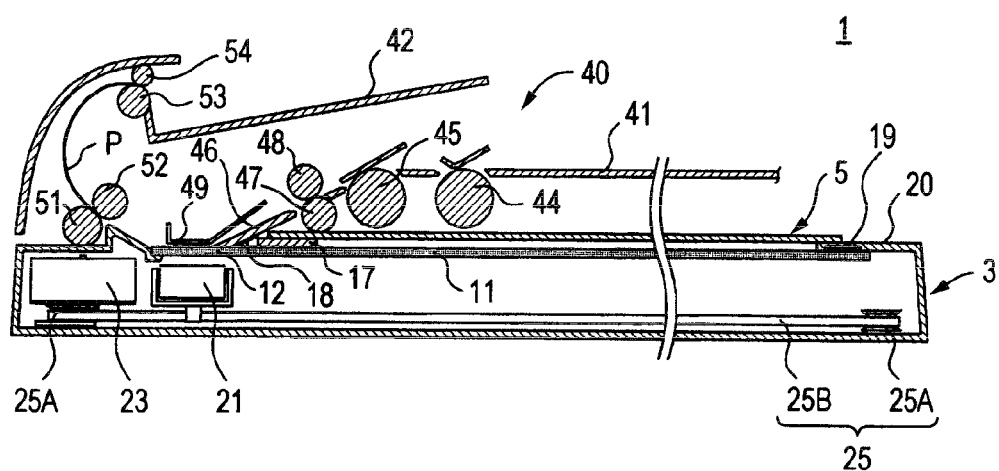
FIGS. 3A and 3B are schematic cross-sectional views cut along a longitudinal direction of the image reading apparatus.
Figure 3B:
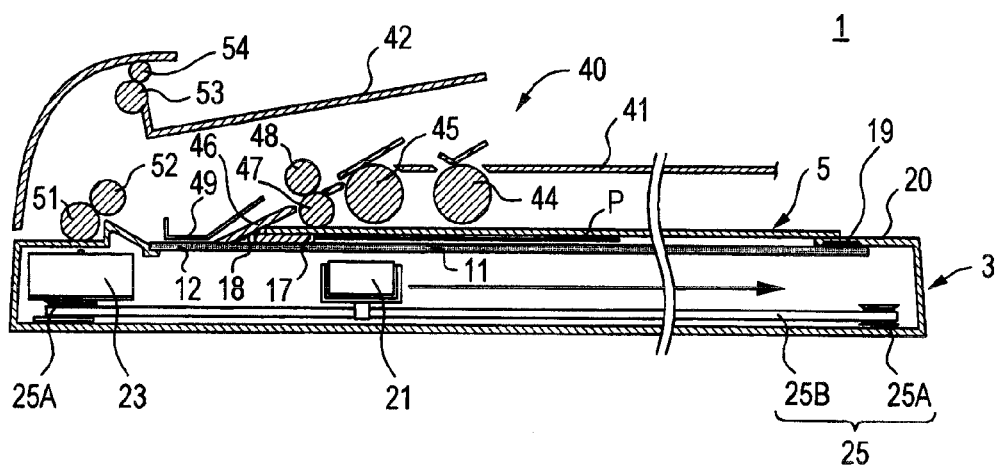

As shown in FIGS. 3A and 3B showing a cross-section cut along a longitudinal direction (left-right direction), the main body 3 defining a part of the image reading apparatus 1 of the embodiment includes: a platen glass 13 as an example of a document table including the first read surface 11 and the second read surface 12; a cabinet 20 that supports the platen glass 13; the positioning member 17 configured to position the document P placed on the first read surface 11; a white reference member 18 and a black reference member 19 as an example of reference member; a document read unit 21 (CIS); and an FB motor 23 and a belt mechanism unit 25 configured to move the document read unit 21.

The platen glass 13 is supported from below by a glass support member (not shown) and fixed to the cabinet 20 by the frame body 31. The frame body 31 extends, substantially in parallel with a bottom surface of the cabinet 20, from an upper edge of the cabinet 20 to a center thereof in plan view. Specifically, as shown in FIG. 2, a rear end part (the upper side in FIG. 2) and a right end part (the right side in FIG. 2) of the platen glass 13 are pressed downward from above by the frame body 31, thereby being fixed to the cabinet 20. A front left end part of the platen glass 13 is pressed downward from above by a glass fixing part 33 that extends from a front left end part of the frame body 31. Accordingly, the platen glass 13 is fixed so as to prevent the platen glass 13 from being separated from the cabinet 20.

The surface of the platen glass 13 is divided into the first read surface 11 and the second read surface 12 by the positioning member 17 which is detachably attached to the cabinet 20. The first read surface 11 is an area for reading the document P placed on the surface by the user and is provided in the right side area of the image reading apparatus 1. On the other hand, the second read surface 12 is an area for reading the document P conveyed by a document conveyer 40 provided on the FB cover 5 and is provided in the left side area of the image reading apparatus 1.

The document read unit 21 is housed in the cabinet 20 such that the document read unit 21 is movable in the left-right direction (subscanning direction) to face backs of the first and second read surfaces 11 and 12 (namely, the rear surface of the platen glass 13). As shown in FIGS. 3A and 3B, the document read unit 21 is fixed to a belt 25B wound around a pair of rollers 25A of the belt mechanism unit 25 and moves in the left-right direction of the image reading apparatus 1 together with the belt 25B run by power generated by the FB motor 23.

FIG. 3A is a schematic diagram showing a fixed position of the document read unit 21 for reading the document P conveyed on the second read surface 12 using the document conveyer 40 provided in the FB cover 5. FIG. 3B is a schematic diagram showing a scanning mode of the document read unit 21 for reading the document P placed on the first read surface 11.

When the document P conveyed on the second read surface 12 by the document conveyer 40 is read, the document read unit 21 is moved and fixed to a position under the second read surface 12. When reading the document P on the first read surface 11, the document read unit 21 is moved in the left-right direction under the first read surface 11 by the FB motor 23 and the belt mechanism unit 25.

The FB cover 5 includes the document conveyer 40. The document P placed on a sheet feed tray 41 is conveyed onto the second read surface 12, and the document P read by the document read unit 21 on the second read surface 12 is discharged to a sheet discharge tray 42.

Specifically, the document conveyer 40 includes sheet feed rollers 44 and 45 at the start point of the conveying path. The document P placed on the sheet feed tray 41 is conveyed downstream of the conveying path by the sheet feed rollers 44 and 45. The document P conveyed by the sheet feed rollers 44 and 45 is conveyed further downstream of the conveying path by conveying rollers 47 and 48 to a guide plate 46 inclined slantingly toward the second read surface 12.

An upper face 49 opposed to the second read surface 12 is provided downstream of the guide plate 46 with a predetermined gap with the second read surface 12. The document P conveyed by the conveying rollers 47 and 48 passes through the gap between the upper face 49 and the second read surface 12 and is conveyed by a pair of conveying rollers 51 and 52 provided further downstream of the conveying path and subsequently is discharged to the sheet discharge tray 42 by a pair of sheet discharge rollers 53 and 54.

The white reference member 18 is disposed on the lower face of the guide plate 46 and extending in the front-rear direction. The white reference member 18 has steps and is colored in white. Consequently, the white reference member 18 is used as the brightness reference of a line image sensor 21C (see FIG. 4) as described later. The black reference member 19 is a black-colored thin film belt opposed to the right end portion of a movable range of the document read unit 21 and disposed between the cabinet 20 (strictly, the frame body 31) and the platen glass 13 so as to extend in the front-rear direction.

Figure 4:
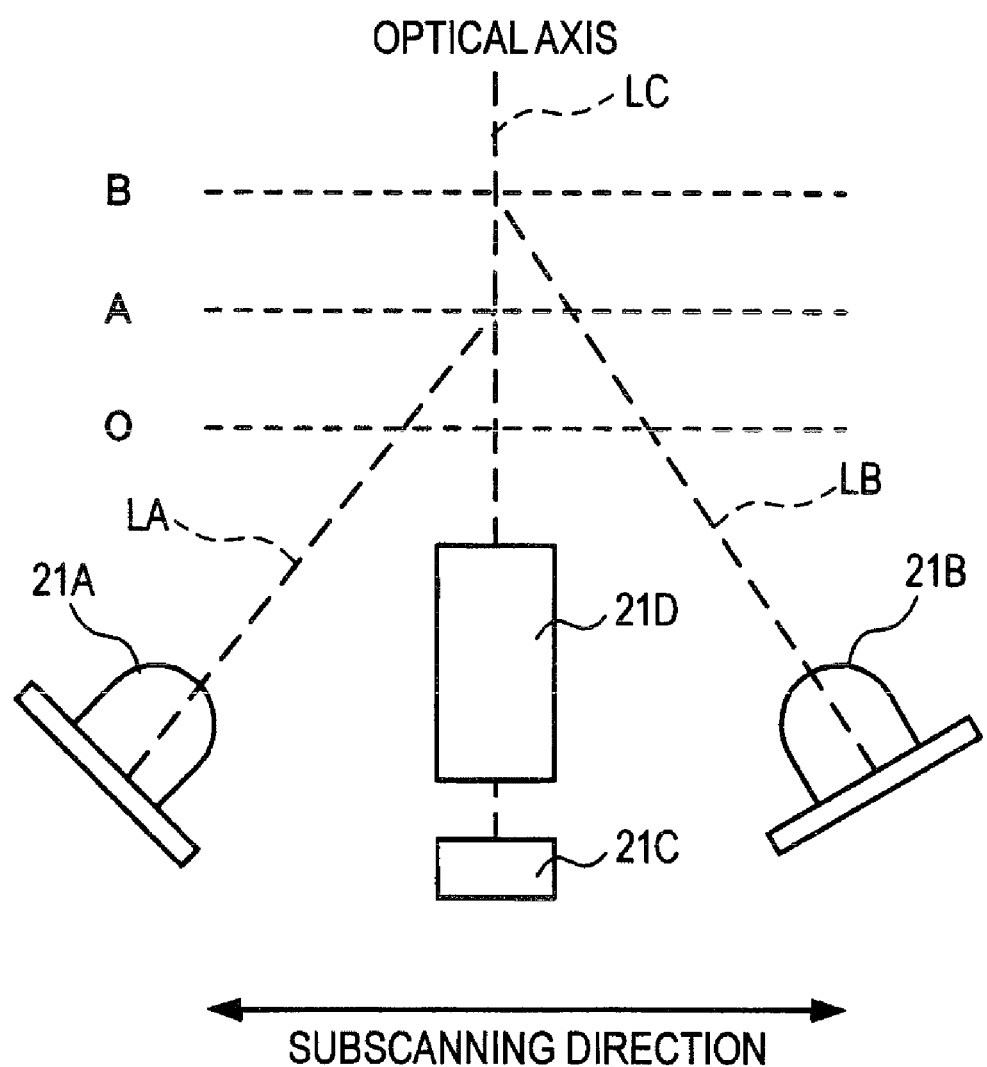
FIG. 4 is a schematic diagram showing a document read unit of the image reading apparatus.

The document read unit 21 includes two light sources 21A and 21B and the line image sensor 21C as shown in FIG. 4. The line image sensor 21C includes a plurality of light reception elements as an example of light reception unit arrayed in the front-rear direction (main scanning direction) and receives light reached substantially vertically from a direction of the first and second read surface 11, 12 through a lens 21D.

Each of the light sources 21A and 21B includes a light guide plate extending in the front-rear direction. The light sources 21A and 21B apply light toward the first and second read surface 11, 12 along different optical axes LA and LB. The optical axes LA and LB cross an optical axis LC of the line image sensor 21C through the lens 21D at different positions. That is, as shown in FIG. 4, the optical axis LA and the optical axis LC cross each other at a position A higher than a position O of the height of the first and second read surfaces 11 and 12, and the optical axis LB and the optical axis LC cross each other at a position B higher than the position A.

Consequently, the light reception amount of the line image sensor 21C when light is applied only from the light source 21A, the light reception amount of the line image sensor 21C when light is applied only from the light source 21B, and the light reception amount of the line image sensor 21C when light is applied from both the light sources 21A and 21B change in response to the height of the document P from the first read surface 11, for example.

Figure 5:
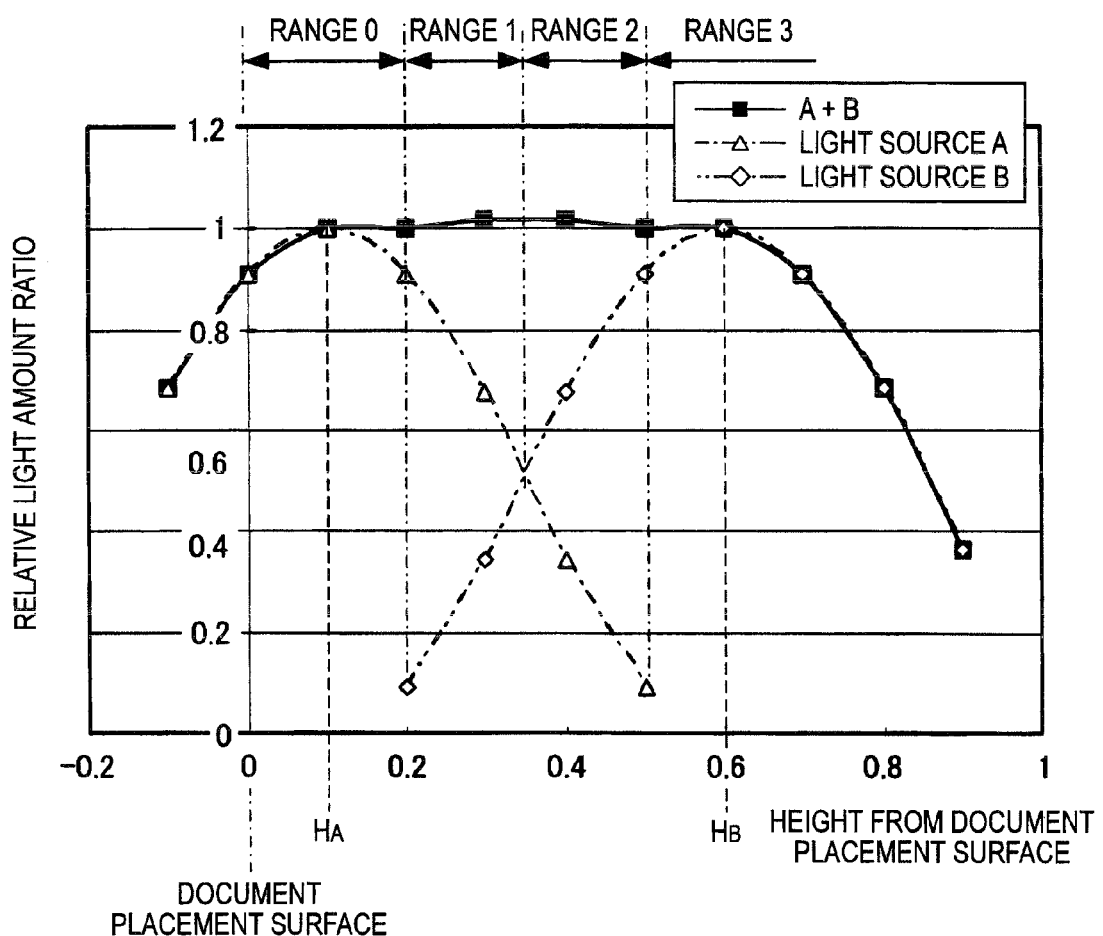
FIG. 5 is an illumination depth graph created for each light source of the document read unit.

For example, FIG. 5 is an illumination depth graph to represent the light reception amount (Δ: triangle) of the line image sensor 21C when light is applied only from the light source 21A (hereinafter, also written as the light source A), the light reception amount (◇: diamond) of the line image sensor 21C when light is applied only from the light source 21B (hereinafter, also written as the light source B), and the light reception amount (■: black squire) of the line image sensor 21C when light is applied from both the light sources 21A and 21B (A+B) in response to the height of the document P from the first read surface 11 (document placement surface) reflecting the light. The illumination depth graph of FIG. 5 represents the relative light amount normalized so that the maximum value becomes 1.

As shown in FIG. 5, the light reception amount only from the light source 21A indicates a peak when the document P exists at height $H_A$ of the position A previously described with reference to FIG. 4, and the light reception amount only from the light source 21B indicates a peak when the document P exists at height $H_B$ of the position B previously described with reference to FIG. 4. The light reception amount from both the light sources 21A and 21B becomes the sum of the light reception amount from the light sources 21A and the light reception amount from the light sources 21B and indicates almost a constant value between the heights $H_A$ and $H_B$.

Figure 6:
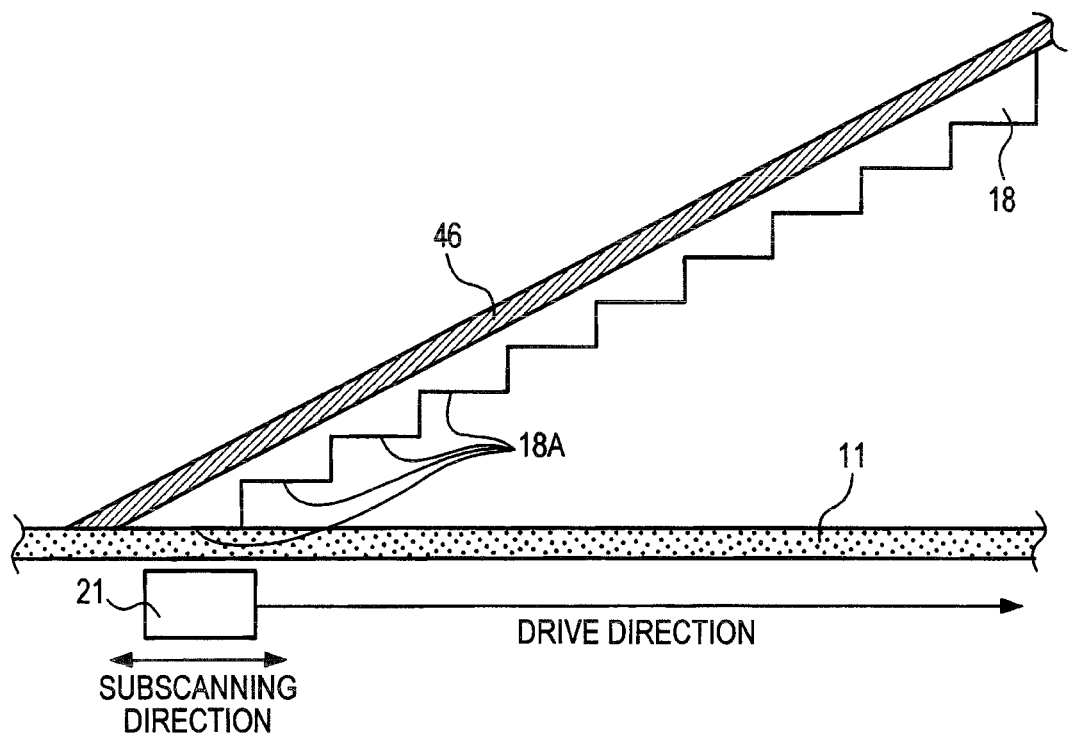
FIG. 6 is a schematic diagram showing a white reference member of the image reading apparatus.

The white reference member 18 has steps in the subscanning direction as shown in FIG. 6 so that the illumination depth graph, e.g., shown in FIG. 5, can be created based on the measurement values. For example, the white reference member 18 includes 10 steps 18A at intervals of 0.1 mm from the bottom step abutting the platen glass 13 (height 0 mm) to the top step (the height from the platen glass 13 is 0.9 mm) and is fixed to the lower (rear) face of the guide plate 46. Each step 18A is opposed to the platen glass 13 in parallel throughout the arrayed range of the line image sensor 21C and can be used as the brightness reference of the line image sensor 21C.

(Control System of Image Reading Apparatus and Processing)

Figure 7:
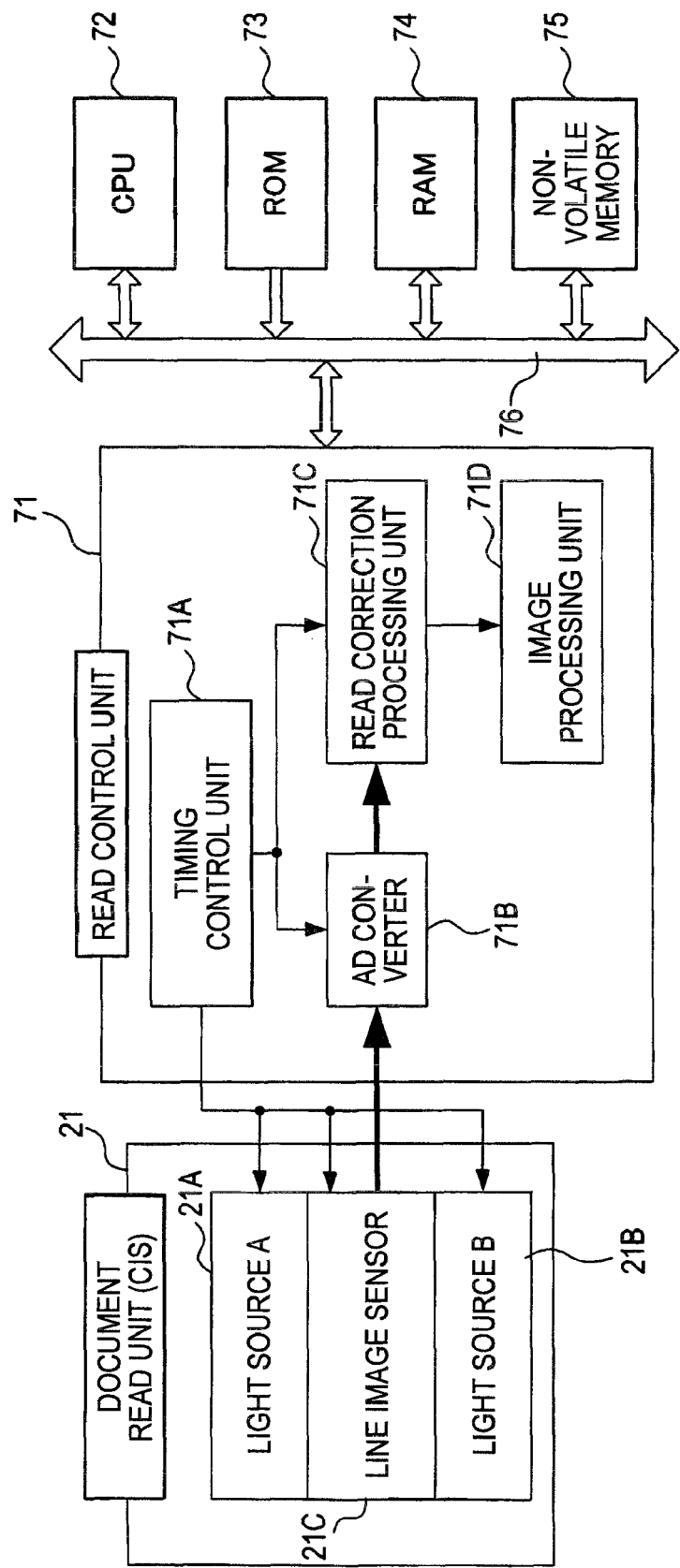
FIG. 7 is a block diagram showing a control system of the image reading apparatus.

As shown in FIG. 7, the control system of the image reading apparatus 1 includes a read control unit 71 for controlling the document read unit 21, a CPU 72, ROM 73, RAM 74, and nonvolatile memory 75, which are connected through a bus 76.

The read control unit 71 includes a timing control unit 71A for outputting timing signals for indicating the turning on timing of the light source 21A, 21B and the read timing of the line image sensor 21C and an AD converter 71B for converting an input value (analog value) from the line image sensor 21C into digital data in response to the timing signal. The read control unit 71 further includes a read correction processing unit 71C for performing correction processing described later to the data provided by the AD converter 71B in response to the timing signal and an image processing unit 71D for executing various types of processing for the image data after being subjected to the correction processing. Although not shown in FIG. 7, the bus 76 is connected, in addition to the read control unit 71, with the FB motor 23, the operation unit 15, and the like are connected to the bus 76 through various drive circuits, etc.

Subsequently, processing executed by the CPU 72 based on a program stored in the ROM 73 will be discussed with reference to FIG. 8. A main routine of processing shown in FIG. 8 is executed by the CPU 72 through the read control unit 71, etc., when the user enters a command for reading an image of a document P placed on the first read surface 11 through the operation unit 15.

Figure 8:
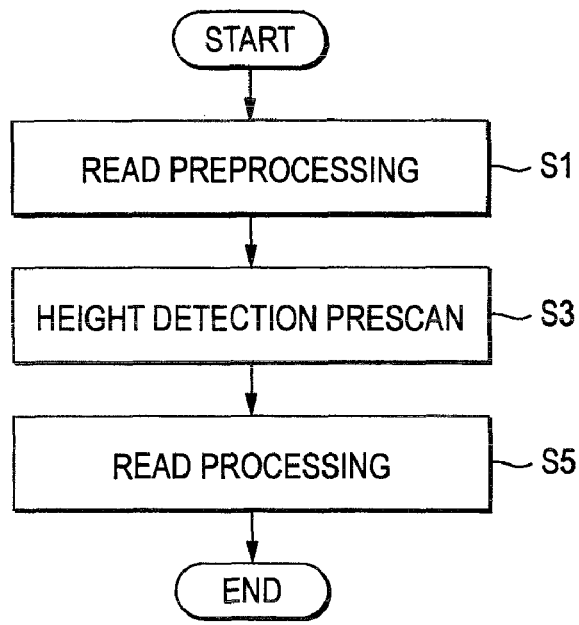
FIG. 8 is a flowchart showing a main routine of processing of the control system.

As shown in FIG. 8, in the processing, first, read preprocessing to make various adjustments is executed at step 1 (S1) and subsequently height detection prescan for detecting the height of the document P is executed (S3). After the processing, read processing for reading the image written on the document P is executed (S5) and the processing is complete.

Figure 9:
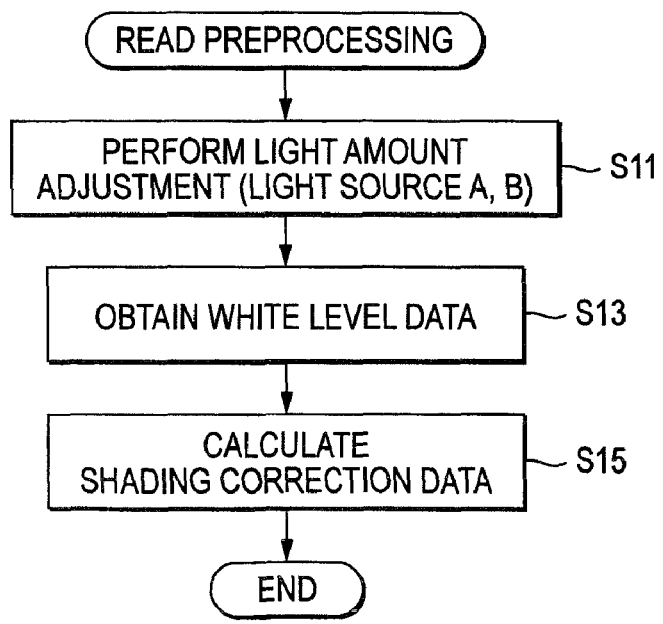
FIG. 9 is a flowchart showing a read preprocessing in detail.
Figure 10:
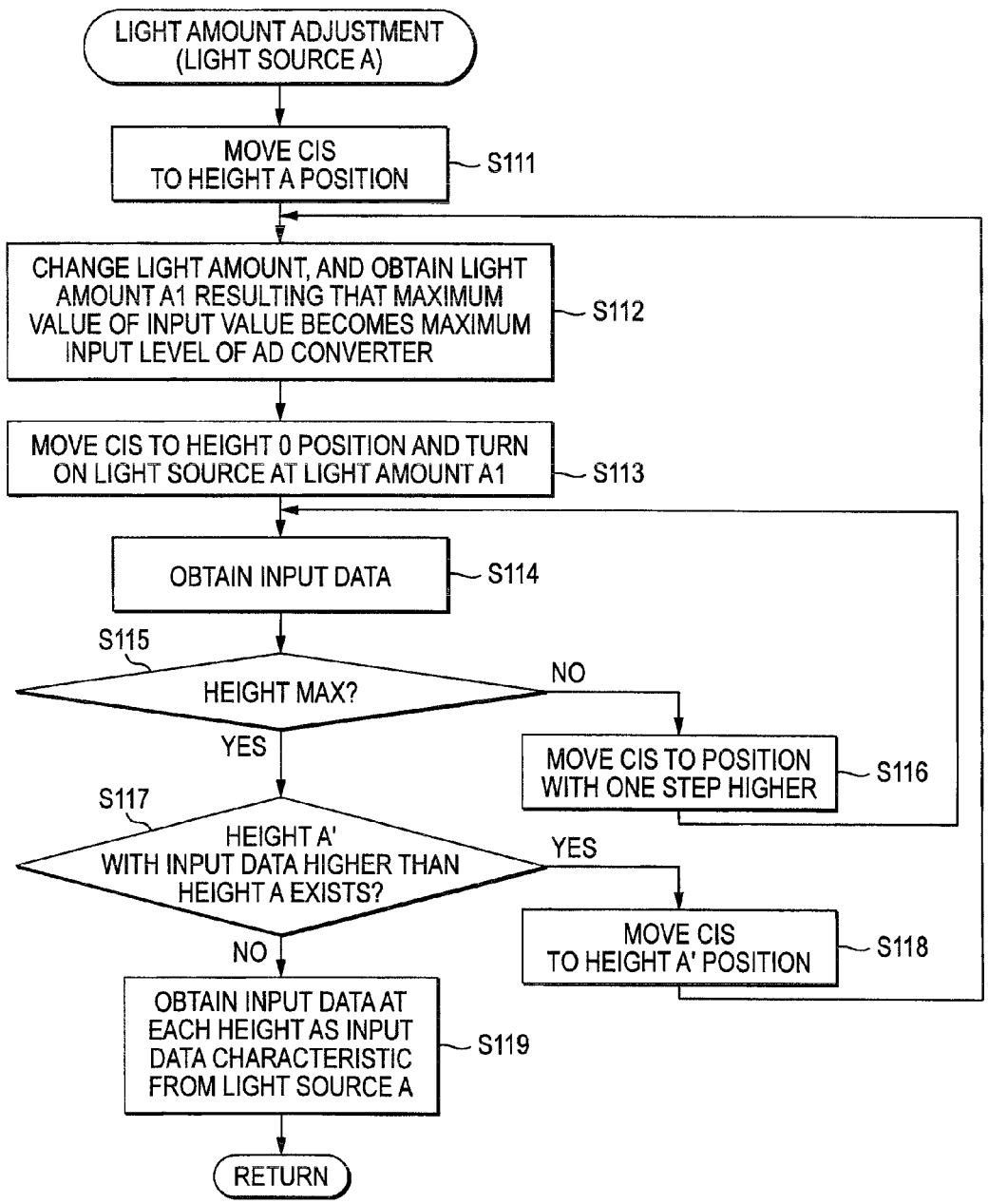
FIG. 10 is a flowchart showing light amount adjustment of the read preprocessing.

As shown in FIG. 9, in the read processing, at first, light amount adjustment is performed for the light sources 21A and 21B at S11. As shown in FIG. 10, in the light amount adjustment, at S111, the document read unit 21 (CIS) is moved to the height A position, namely, the position opposed to the step 18A disposed at the height of the position A shown in FIG. 4. The height A position is previously stored in the nonvolatile memory 75 at the shipping time, etc.

At S112, the light amount of the light source 21A is changed so as to obtain a light amount A1 of the light source 21A which results in that a maximum value of the input value (analog value) input from the line image sensor 21C to the AD converter 71B becomes a maximum input level of the AD converter 71B.

At S113, the document read unit 21 is moved to the height 0 position, namely, the position opposed to the step 18A abutting the platen glass 13 and the light source 21A is turned on in the light amount A1. At S114 as an example of operation of a light reception amount obtaining unit, input data from the line image sensor 21C is obtained. At S115, it is determined whether the position of the document read unit 21 at this time is the height MAX position opposed to the step 18A whose height is the maximum (MAX). In the beginning, the document read unit 21 is disposed at the height 0 position (see S113) and thus the determination at S115 is NO (No at S115) and the process goes to S116. At S116, the document read unit 21 is moved to the position opposed to the step 18A one step higher than the position at this point and the process goes to S114 described above.

According to the loop processing of S114 to 5116, while the document read unit 21 is moved from the height 0 position to the height MAX position, processing of turning on the light source 21A in the light amount A1 and obtaining input data is executed in sequence. When the input data for the height MAX position is obtained (Yes at S115), the process goes to S117 and it is determined whether there is a position (height A' position) where input data of a higher value than the input data obtained at the height A position among the pieces of the input data obtained by performing processing at S114 to S116.

If the optical axis LA and the optical axis LC cross each other precisely at the position as described with reference to FIG. 4 and the position of the white reference member 18 is disposed at the position as the initial design, the input data obtained by the document read unit 21 at the height A position at S111 should indicate the highest value. However, if the positional relationship among the components shift due to aging, etc., input data of a higher value than the input data obtained at the A position may be obtained at any other position. In this case (Yes at S117), the process goes to S118 and the document read unit 21 is moved to the height A' position and then the process goes to S112 described above. Then, the light amount A1 is again set such that the maximum value of the input value at the A' position becomes the maximum input level of the AD converter 71B (S112), and the processing at S113 to S117 is again executed.

If there is no position where input data of a higher value than the input data obtained at the height A' position (new height A position) set in sequence as required (No at S117), the process goes to S119. At S119, the input data at each height is obtained as the input data characteristic from the light source 21A, and is stored in a predetermined storage area (an example of reception light amount storage unit) of the nonvolatile memory 75. The processing makes it possible to create an illumination depth graph as indicated by the alternate long and short dash line in FIG. 5.

Referring again to FIG. 9, at S11, such processing is also performed for the light source 21B in a similar manner, thereby making it possible to create an illumination depth graph as indicated by the alternate long and short dash line in FIG. 5 and further also making it possible to create an illumination depth graph as indicated by the solid line in FIG. 5. At S13, the input data obtained from each light reception element for each height at S114 described above is obtained as white level data. At S15, shading correction data is calculated for each height, e.g., by known method, based on the white level data. Then, the process returns to S3 of the main routine in FIG. 8.

Next, the height detection prescan at S3 will be described in detail with reference to FIG. 11. The processing is executed as the document P is divided into M pieces in the main scanning direction and is divided into N pieces in the sub-scanning direction, so as to provide a matrix having M×N cells in the area (where M and N are each a natural number of two or more). Hereinafter, each of the subareas (cells) into which the document P is divided as described above will be represented as (m, n) $1 \leq n \leq N$) and the position of the subarea (m, n) will be represented as Yn, as shown in FIG. 12.

Figure 11:
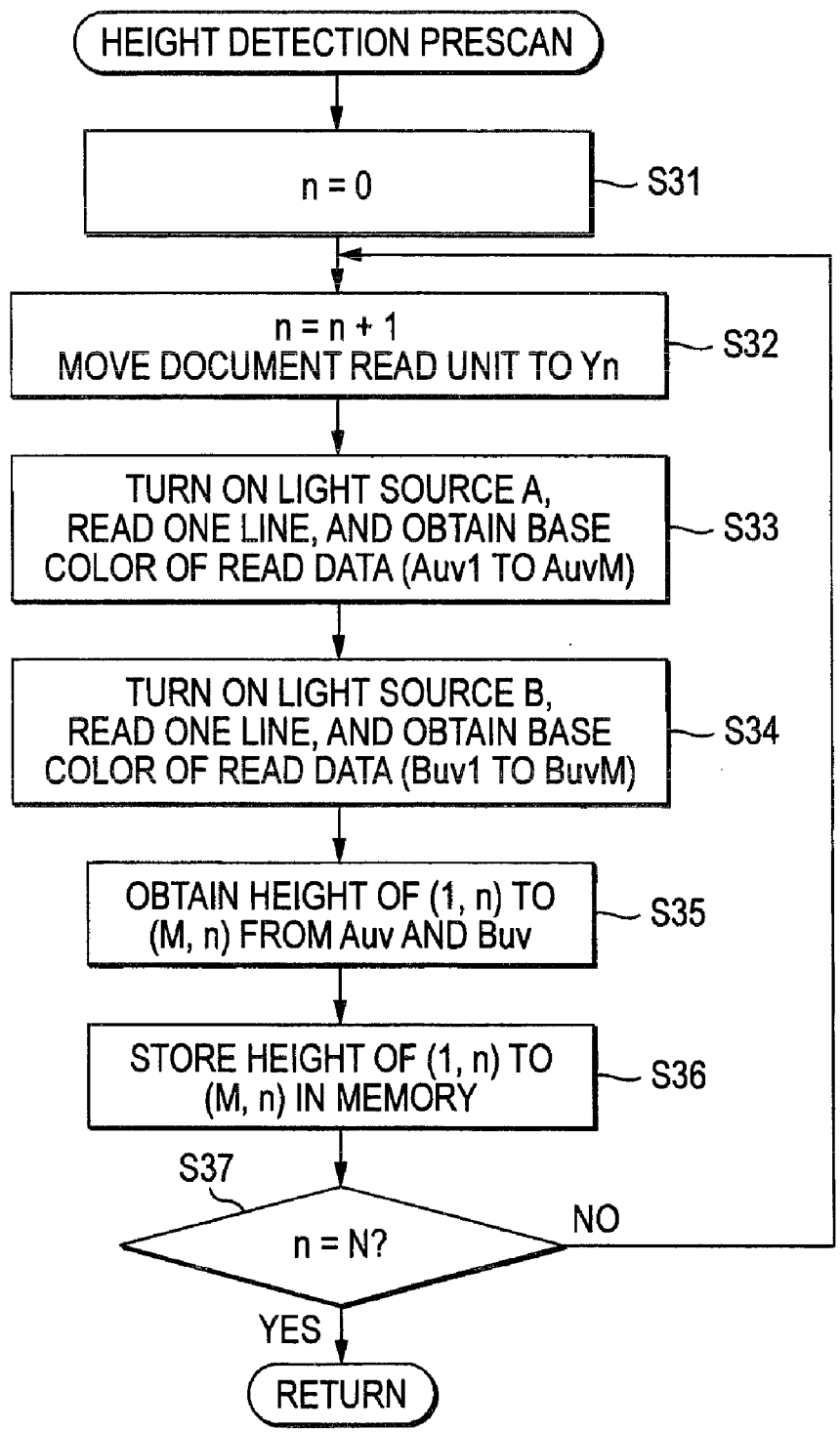
FIG. 11 is a flowchart to represent height detection prescan in the main routine in detail.
Figure 12:
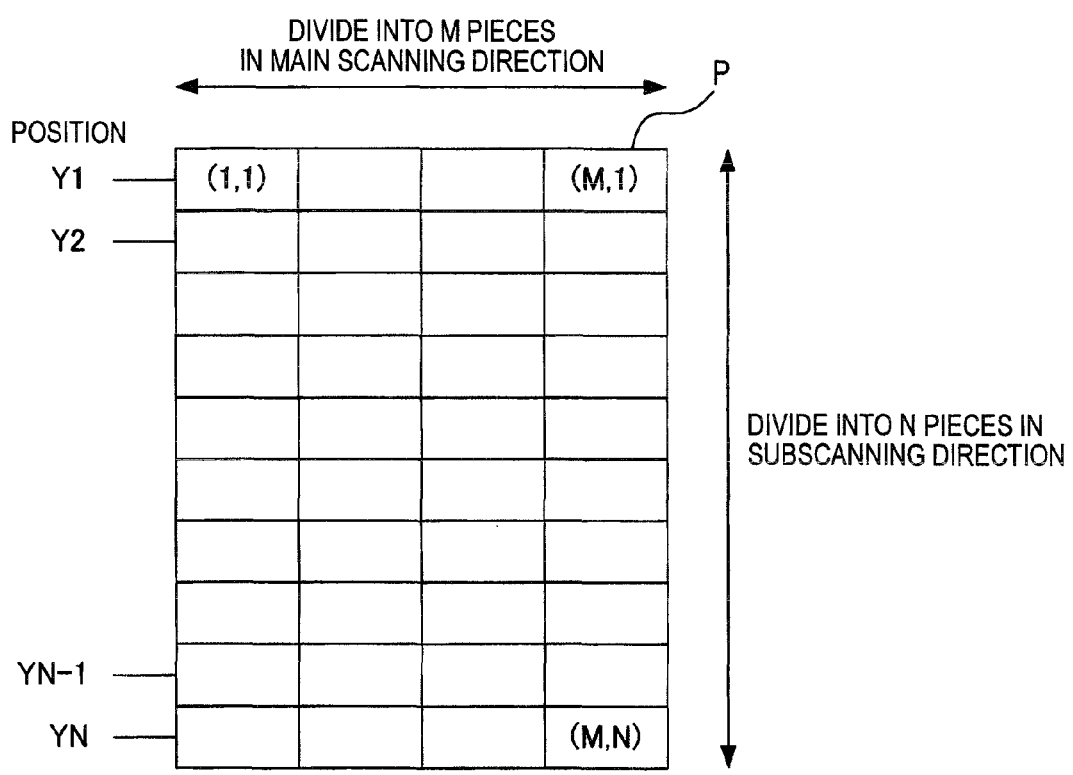
FIG. 12 is a schematic diagram showing a mode in which a document area is divided in the processing.

As shown in FIG. 11, in the processing, a variable n is reset to 0 at S31. At S32, the variable n is incremented by one, and the document read unit 21 is moved to a position Yn. At S33, the light source 21A is turned on, input data from each light reception element of the line image sensor 21C, namely, one-line input data is obtained, and base color (Auv1 to AuvM) of each subarea is obtained. The base color is the reflected light amount from the portion where no image of the document P is formed; here, the maximum value of the input data from the light reception element corresponding to each subarea is obtained as the base color. At S34, the light source 21B is turned on and base color (Buv1 to BuvM) of each subarea is obtained in a similar manner. The processing at S33 and S34 is an example of operation of a read control unit.

Figure 13:
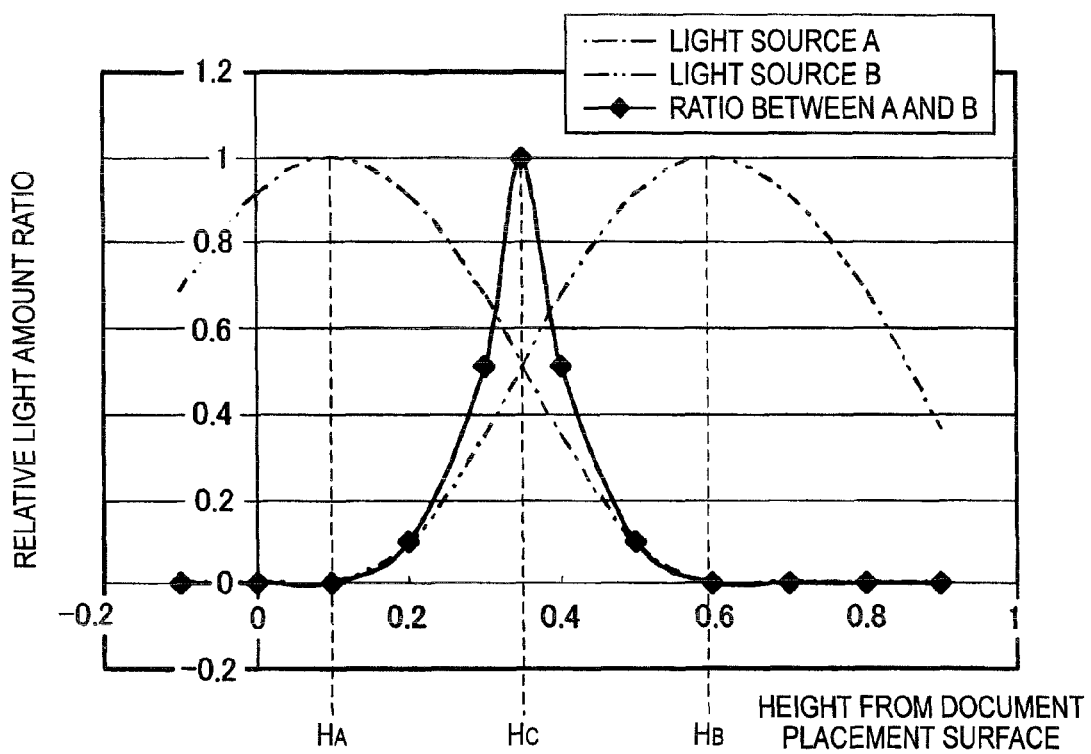
FIG. 13 is a schematic diagram showing a function used in the processing.

At S35 as an example of operation of a distance calculation unit, the height of the document P in each of the subareas (1, n) to (M, n) is obtained by the following processes based on (Auv1 to AuvM) obtained at S33 and (Buv1 to BuvM) obtained at S34. As described above, an illumination depth graph as indicated by the alternate long and short dash line in FIG. 13 can be created based on the input data when only the light source 21A is turned on and reflected light from each step 18A is read, and an illumination depth graph as indicated by the alternate long and two short dashes line in FIG. 13 can be created based on the input data when only the light source 21B is turned on and reflected light from each step 18A is read. Here the former is defined as fA(h), the latter is defined as fB(h), and the height where fA(h) and fB(h) cross each other is defined as $H_c$. In this case a function fAB(h) as represented by the following formula can be considered based on the ratio between fA(h) and fB(h) (where h is the height of the document P). In FIG. 13, a curve corresponding to the function fAB(h) is indicated by the solid line.

$$fAB(h) = \begin{cases} fB(h)/fA(h) & h < H_c \\ fA(h)/fB(h) & h > H_c \\ 1 & h = H_c \end{cases}$$

A comparison is made between the base color Auv obtained by turning on the light source 21A for one subarea and the base color Buv obtained by turning on the light source 21B. If Auv>Buv, the value of h satisfying Buv/Auv=fAB(h) (where h<$H_c$) is adopted as the height of the document P in the subarea. Likewise, if Auv<Buv, the value of h satisfying Auv/Buv=fAB(h) (where h>$H_c$) is adopted as the height of the document P in the subarea and if Auv=Buv, the height of the document P in the subarea is $H_c$. The function fAB(h) is created based on the data stored in the predetermined storage area by performing the processing at S119.

Thus, when the height of the document P in each of the subareas (1, n) to (M, n) is obtained at S35, the height of each of the subareas (1, n) to (M, n) is stored in the RAM 74 at S36 and whether or not n=N is determined at S37. If n≠N (No at S37), the process goes to S32, the variable n is incremented by one, and the document read unit 21 is moved to the position Yn corresponding to the n and then S33 to S37 described above are executed. Thus, when the processing at S32 to S37 is repeated and the height of the document P in every subarea (1, 1) to (M, N) is obtained and n becomes equal to N (Yes at S37), read processing at S5 is executed (see FIG. 8).

Figure 14:
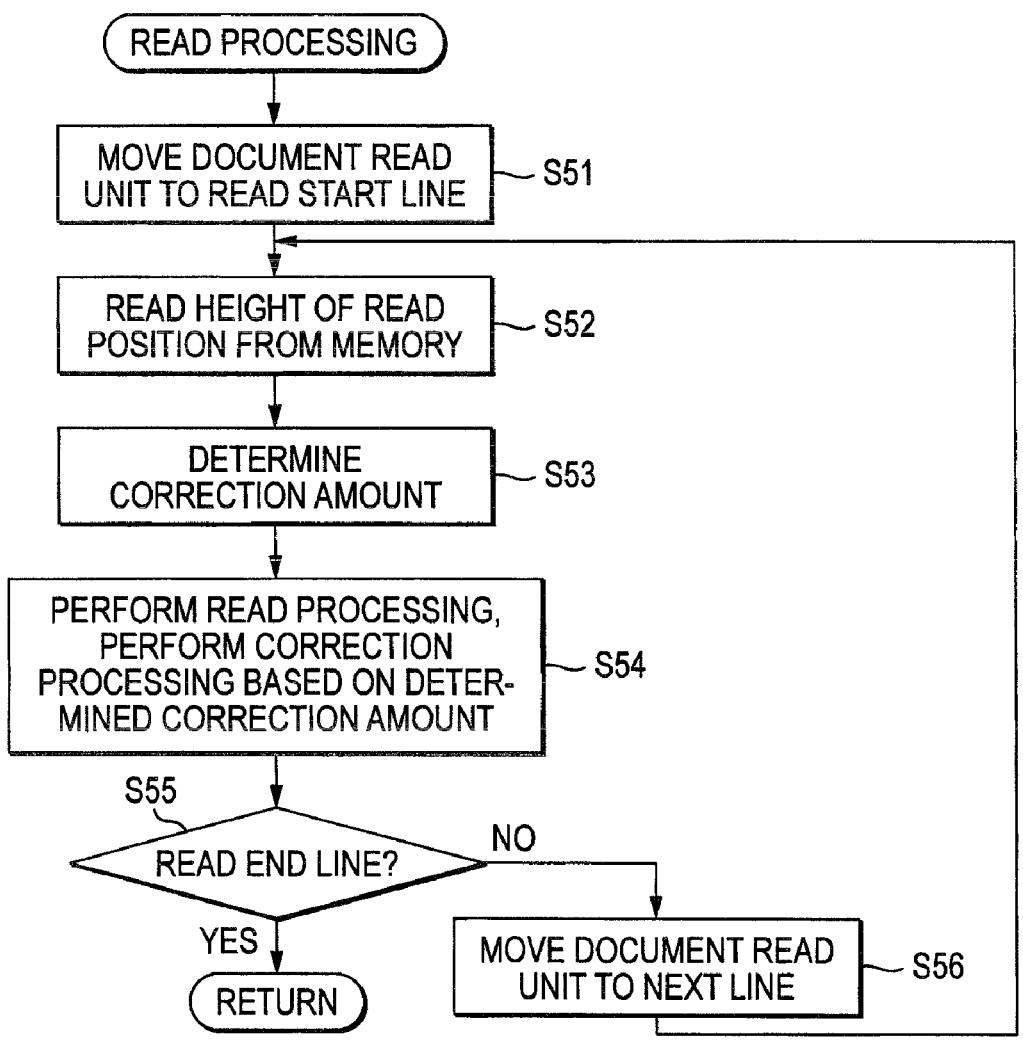
FIG. 14 is a flowchart showing read processing in the main routine in detail.

Next, read processing will be described with reference to FIG. 14. As shown in FIG. 14, at S51, the document read unit 21 is moved to a read start line. Since the document read resolution and the number of divisions N do not necessarily match, the read start line does not necessarily match the position Y1. At S52, the height of the document P at the read position of the document read unit 21 at the position at the point in time is read from the storage area where the height is stored at S36 and subsequently the correction amount to the image read by the document read unit 21 is determined at S53 as an example of correction amount determination unit.

For example, the following various corrections are considered as correction responsive to the height of the document P.

1. Correction of Shading Correction Data

Shading correction responsive to the height of the document P is made possible by using shading correction data SHD for each height calculated at S13 and S15 based on the input data obtained from each light reception element for each height at S114 described above. The shading correction formula at this time is as follows:

$$f(x) = g(x) \times SHD(x, h)$$

where f(x) is image data after shading correction, g(x) is image data before shading correction, x is the pixel position in the main scanning direction, and h is the height of the document P.

The shading correction data SHD include data determined from the pixel position x and the height of the document P, and for example, is a two dimensional table. The shading correction data SHD is previously obtained for each height and interpolation is adopted therebetween, whereby the memory for holding the data can be lessened. The shading correction data responsive to the height may be obtained according to the following formula based on shading correction data SHD_A calculated based on the white level data obtained by turning on the light source 21A using the step 18A of the height A and shading correction data SHD_B calculated based on the white level data obtained by turning on the light source 21B using the step 18A of the height B:

$$SHD=SHD\_A \times kA(h)+SHD\_B \times kB(h)$$

where kA(h) is the relative light amount normalized so that the maximum value becomes 1 in the illumination depth graph obtained by turning on the light source 21A and in response to the height, and kB(h) is the relative light amount normalized so that the maximum value becomes 1 in the illumination depth graph obtained by turning on the light source 21B and in response to the height. The shading correction formula at the time is as follows:

$$f(x)=g(x) \times (SHD\_A \times kA(h)+SHD\_B \times kB(h))$$

2. MTF (Modulation Transfer Function) Correction

When the height of the document face becomes high, the MTF value (resolving power) lowers, resulting in blurred image data. In general image processing, an emphasis filter is used as the MTF correction. The emphasis degree through the emphasis filter is changed in response to the height, whereby if a part of the document P is spaced from the read surface, an image blur can be corrected to some extent. An example of the emphasis filter is shown in the following formulae (1) and (2):

$$g(x, y) = \sum_{i=-1}^{1} \sum_{j=-1}^{1} f(x+i, y+j)H(i+1, j+1) \quad (1)$$

$$H = \begin{bmatrix} 0 & -k/4 & 0 \\ -k/4 & k+1 & -K/4 \\ 0 & -k/4 & 0 \end{bmatrix} \quad (2)$$

In the formula (1), g (x, y) is image data after emphasis processing and f (x, y) is original image data. A filter coefficient H used in the formula (1) is set so that as an emphasis coefficient k is increased, a second derivative value for subtraction increases and the emphasis degree increases as shown in the formula (2). Then, it is advisable to increase the emphasis coefficient k of the filter in response to the height of the document P. For example, the emphasis coefficient k at the height where the MTF value becomes the maximum may be set to 1 and the emphasis coefficient k at the height where the MTF value becomes a half may be set to 2.

3. Distortion Correction, Etc.

Further, a comparison is made between the height of the document P in one subarea (m, n) and that in another subarea (m, n), whereby the inclination of the document P can be estimated. Thus, distortion of an image may be corrected in response to the inclination of the document P (height change). In addition, various corrections can be made, for example, in such a manner that the light emission amount of each of the light sources 21A and 21B is adjusted in response to the height of the document P. The shading correction data SHD, the emphasis coefficient k, the distortion correction amount, the light emission amount, etc., corresponds to the correction amount.

When the correction amount is determined as described above at S53, then at S54, known read processing of reading an image of the read line by the document read unit 21 at the position at the point in time is executed and the read image is corrected based on the correction amount determined at S53 as described above. In the read processing at S54, both the light sources 21A and 21B need not necessarily be turned on. For example, the light source 21B may be turned off in range 0 shown in FIG. 5 and the light source 21A may be turned off in range 3. Thus, the unnecessary light source 21A or 21B may be turned off in response to the height of the document P, whereby power consumption can be decreased.

At S55, it is determined whether the line read at S54 is the read end line. If the line is not the read end line (No at S55), the document read unit 21 is moved to the next line at S56 and then the process goes to S52 described above. Thus, when the image is read to the read end line of the document P (Yes at S55) while the processing at S52 to S56 is repeated, the processing once terminates (see FIG. 8).

Advantages of the Embodiment and Modified Examples

In the embodiment, each of the light sources 21A and 21B is turned on individually, whereby the height of the document P is calculated (S33 to S35) and the correction amount of the read image can be determined based on the height (S53). In the embodiment, the height h of the document P is calculated based on the ratio between the base color Auv obtained by turning on the light source 21A and the base color Buv obtained by turning on the light source 21B (S35). Therefore, even if the base color of the document P is not pure white, the base color (not pure white) hardly affects the calculation of the height h. Moreover, the light amount of each of the light sources 21A and 21B is adjusted so that the maximum value of the input value from the line image sensor 21C becomes the maximum input level of the AD converter 71B (S112). Thus, if the light emission characteristics, etc., of the light sources 21A and 21B differ, calculation of the height h as described above can be well executed.

The invention is not limited to the specific embodiment described above and can be embodied in various forms without departing from the spirit and the scope of the invention. For example, in the embodiment, the height detection prescan (S3) is executed before the read processing (S5), but height detection may be executed in parallel with the read processing.

Figure 15:
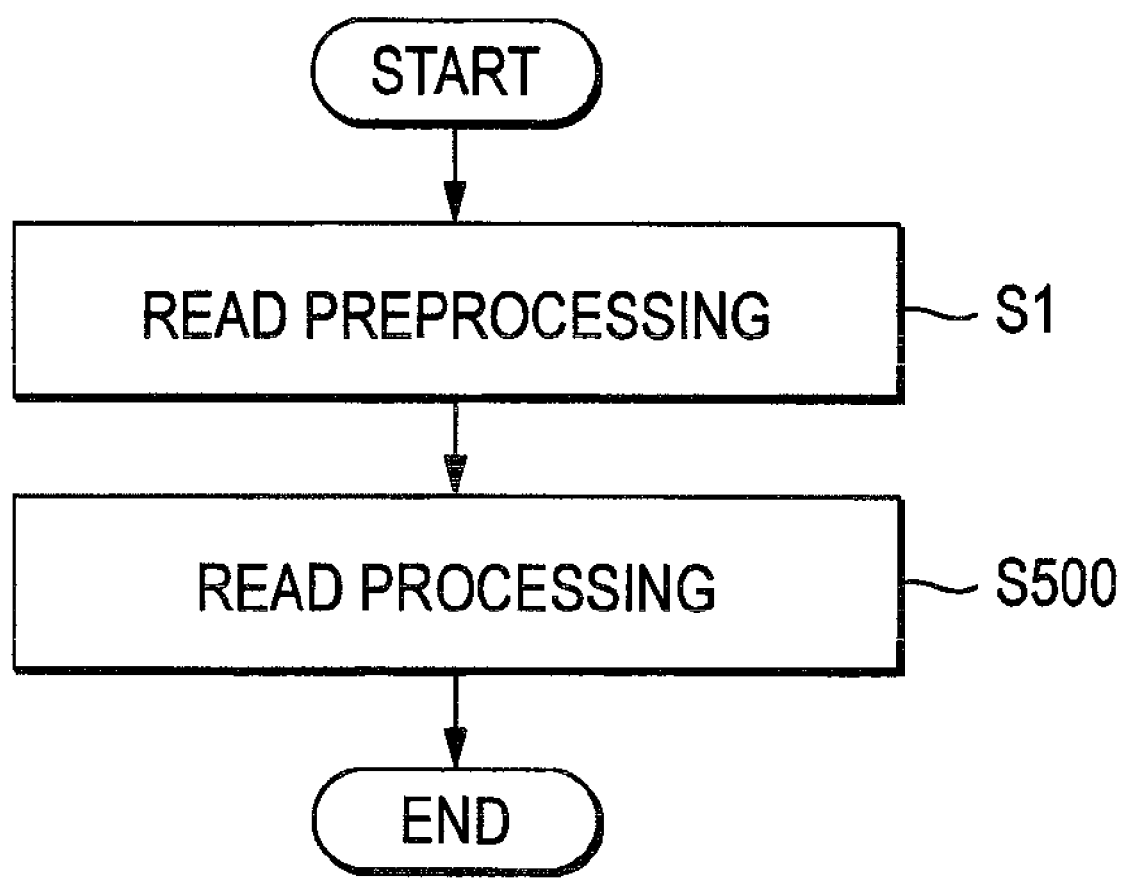
FIG. 15 is a flowchart showing a modified example of the main routine.

Further, in the main routine shown in FIG. 15, the above-described read preprocessing as shown in FIGS. 9 and 10 is executed at S1 and thereafter a read processing may be executed at S500.

Figure 16:
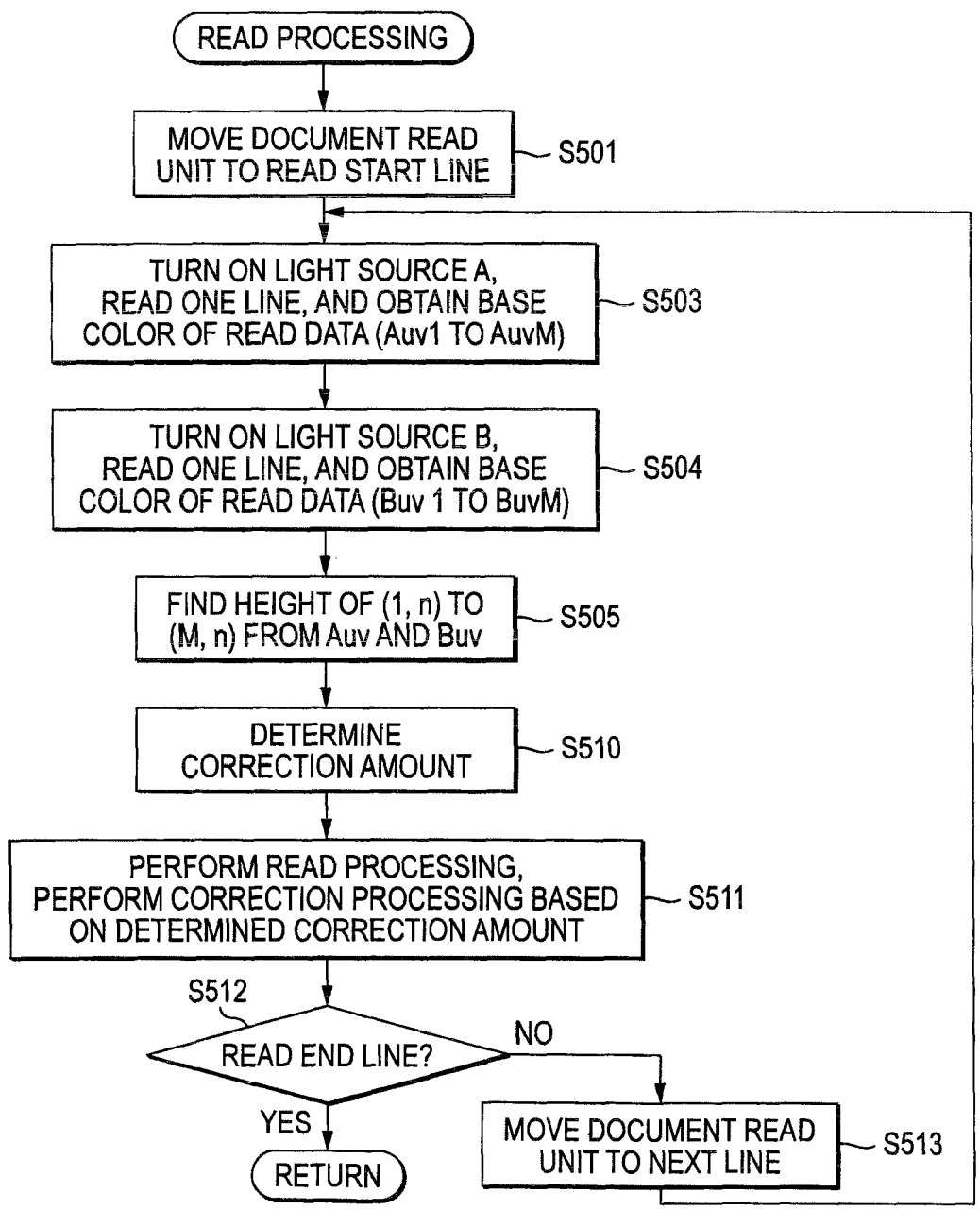
FIG. 16 is a flowchart showing read processing in the processing in detail.

As shown in FIG. 16, in the processing, first at S501, the document read unit 21 is moved to the read start line as at S51 described above and at S503 to S505, the height of the document P in each part of the line is obtained as at S33 to S35 described above. At S510 and S511, the correction amount to the image is determined (S510) as at S53 and S54 described above and the image of the document P is read and the read image is corrected based on the correction amount (S511).

At S512, it is determined whether the line read at S511 is the read end line. If the line is not the read end line (No at S512), the document read unit 21 is moved to the next line at S513 and then the process goes to S503 described above. Thus, when the image is read to the read end line of the document P (Yes at S512) while the processing at S503 to S513 is repeated, the processing once terminates (see FIG. 15).

Also in this case, the correction amount of the read image can be determined based on the height of the document P and if the document P becomes deformed and a part of the document P is spaced from the first read surface 11, etc., the image of the document P can be well read. In the processing, the processing at S503 to S505 need not necessarily be executed for each line; for example, it may be executed every several lines. In the processing, height detection of the document P (S503 to S505) and the read processing (S511) are executed in parallel. Thus, the drive amount of the document read unit 21 in the subscanning direction can be reduced and power consumption can be decreased and further the storage capacity for storing the height can also be lessened. On the other hand, to execute the height detection prescan (S3) before the read processing (S5) as described above, the document image can be read efficiently.

Figure 17:
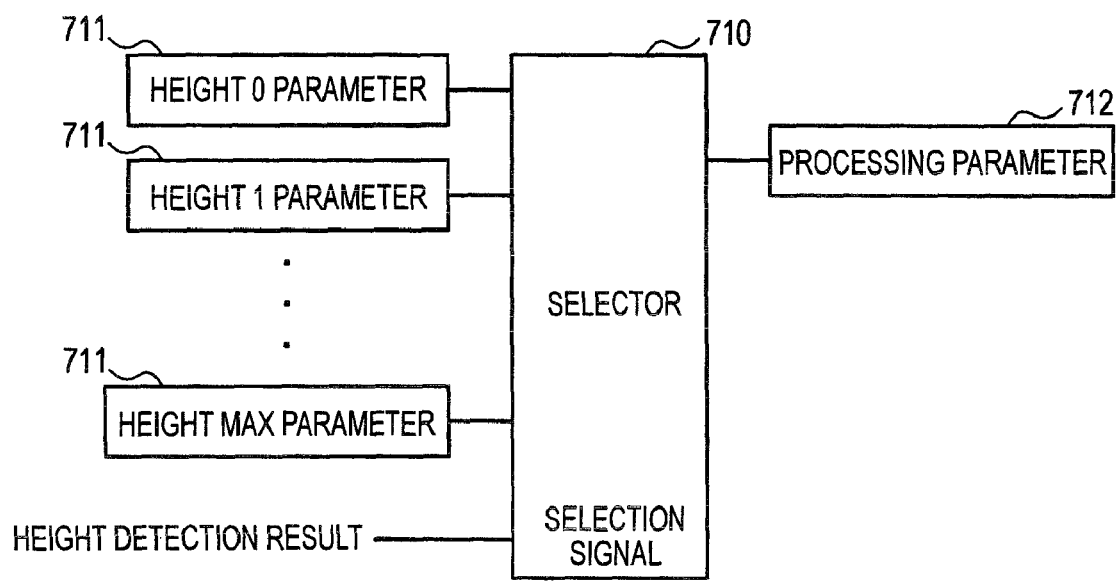
FIG. 17 is a schematic diagram showing the configuration of a modified example using a selector.

In the embodiment described above, the correction amount corresponding to the height of the document P is determined by software. However, the correction amount can also be determined by adopting a circuit using a selector 710. As shown in FIG. 17, by-height parameter storage units 711 storing the correction amounts (parameters) responsive to various heights from height 0 to height Max are connected to the input side of the selector 710. The height detection result of the document P as described above is input to the selector 710 as a selection signal and the parameter responsive to the height detection result is input from the corresponding by-height parameter storage unit 711 and is output to a processing parameter storage unit 712. Thus, similar processing to that described above can be executed by correcting the read image using the parameter (correction amount) output through the selector 710 to the processing parameter storage unit 712.

Figure 18:
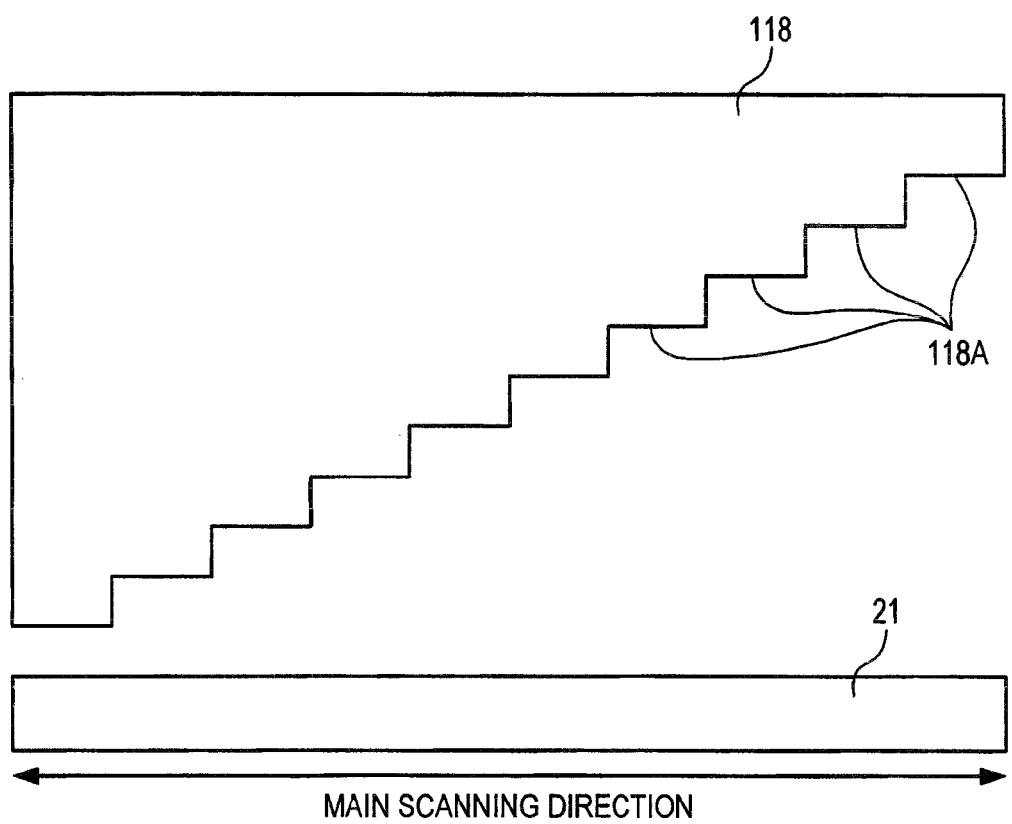
FIG. 18 is a schematic diagram showing the configuration of a modified example of the white reference member.

In the embodiment described above, the white reference member 18 includes steps in the subscanning direction. As shown in FIG. 18, a white reference member 118 may include a plurality of steps 118A arranged in the main scanning direction. In this case, reflected light from each of the steps 118A of various heights can be detected without moving the document read unit 21 and data to create an illumination depth graph can be obtained rapidly. In this case, however, to obtain white level data for shading correction, it is necessary to provide an additional known white reference member formed flat throughout the main scanning direction.

Further, the white reference member may be provided movably in the perpendicular direction to the platen glass 13 and data to create an illumination depth graph may be obtained by moving the white reference member. Further, an illumination depth graph previously (at the shipping time, etc.,) stored in the nonvolatile memory 75, etc., may be used. However, if an illumination depth graph is created based on the actual values using the white reference member 18 or 118 shaped like steps as in the embodiment, the height of the document P can be calculated furthermore precisely.

In the embodiment described above, the document P is divided into the M×N subareas as a matrix, but may be divided in the subscanning direction only and only some of subareas into which the document P is divided in the subscanning direction may be further divided in the main scanning direction. Further, the document P may be divided into a plurality of blocks according to any other appropriate method and the height of each part may be calculated and a plurality of points may be set appropriately in the document P and the height may be calculated only at the setup points. However, to use subareas divided into a matrix as described above, deformation or warpage of the document can be detected still better.

In the embodiment described above, the height h of the document P is calculated based on the ratio between the base color Auv and the base color Buy. However, the height h of the document P may be calculated roughly in such a manner that: if Auv>TH_min and Buv=0, the height of the document is in range 0 in FIG. 5; if Auv>Buv>TH_min, the height of the document is in range 1; if Buv>Auv>TH_min, the height of the document is in range 2; and if Buv>TH_min and Auv=0, the height of the document is in range 3 where TH_min is a predetermined threshold value. Further, although the two light sources 21A and 21B are included in the embodiment described above, three or more light sources may be included. In this case, the height of the document P may be calculated using a complicated illumination depth graph having three or more peaks or the light sources may be classified into two groups and the height of the document P may be calculated in a similar manner to that of the embodiment described above.

What is claimed is:

1. An image reading apparatus comprising:
    a document table having a placement surface on which a document is allowed to be placed;
    a light reception unit configured to receive light from a direction of the placement surface, the light reception unit having a reception optical axis;
    a plurality of light sources configured to apply light toward the placement surface along different optical axes, the plurality of light sources being disposed such that positions at which the optical axes of the plurality of light sources cross the reception optical axis of the light reception unit are different from one another;
    a read control unit configured to execute a read control operation for each of the plurality of light sources, the read control operation comprising: applying light from each of the plurality of light sources toward the placement surface; and reading a light reception amount of the light reception unit for each of the plurality of light sources;
    a light reception amount storage unit configured to store the light reception amount of the light reception unit which is obtained, for each of a plurality of distances between the placement surface and a member that reflects the light toward the light reception unit, by applying the light from each of the plurality of light sources;
    a distance calculation unit configured to calculate a distance between the placement surface and the document based on the light reception amount obtained by the read control operation for each of the plurality of light sources which is executed in a state in which the document is placed on the placement surface, and by referencing the light reception amount stored in the light reception amount storage unit; and
    a correction amount determination unit configured to determine a correction amount to an image of the document read by using one or more of the plurality of light sources and the light reception unit, based on the distance calculated by the distance calculation unit;
    wherein the read control unit executes the read control operation for each of a plurality of subareas set in the document,
    wherein the distance calculation unit calculates the distance for each of the subareas based on the light reception amount obtained by the read control operation for each of the subareas, and
    wherein the correction amount determination unit determines the correction amount for each of the subareas.

2. The image reading apparatus according to claim 1, wherein the plurality of subareas are defined as a matrix by dividing the document into M×N subareas, where each of M and N is a natural number of two or more.

3. The image reading apparatus according to claim 1, wherein the read control unit executes the read control operation before the image of the document is read, and
wherein the distance calculation unit calculates the distance using the light amount obtained by the read control operation performed before the image of the document is read.

4. An image reading apparatus comprising:
a document table having a placement surface on which a document is allowed to be placed;
a light reception unit configured to receive light from a direction of the placement surface, the light reception unit having a reception optical axis;
a plurality of light sources configured to apply light toward the placement surface along different optical axes, the plurality of light sources being disposed such that positions at which the optical axes of the plurality of light sources cross the reception optical axis of the light reception unit are different from one another;
a read control unit configured to execute a read control operation for each of the plurality of light sources, the read control operation comprising: applying light from each of the plurality of light sources toward the placement surface; and reading a light reception amount of the light reception unit for each of the plurality of light sources;
a light reception amount storage unit configured to store the light reception amount of the light reception unit which is obtained, for each of a plurality of distances between the placement surface and a member that reflects the light toward the light reception unit, by applying the light from each of the plurality of light sources;
a distance calculation unit configured to calculate a distance between the placement surface and the document based on the light reception amount obtained by the read control operation for each of the plurality of light sources which is executed in a state in which the document is placed on the placement surface, and by referencing the light reception amount stored in the light reception amount storage unit;
a correction amount determination unit configured to determine a correction amount to an image of the document read by using one or more of the plurality of light sources and the light reception unit, based on the distance calculated by the distance calculation unit;
a reference member comprising steps such that distances from the steps and the document table gradually change; and
a light reception amount obtaining unit configured to execute an obtaining control operation for each of the plurality of light sources, the obtaining control operation comprising: applying light toward each of the steps of the reference member from each of the plurality of light sources; and storing the light reception amount of the light reception unit from each of the steps in the light reception amount storage unit for each of the plurality of light sources before the read control operation of the read control unit.

5. The image reading apparatus according to claim 4, wherein the distances from the steps to the document table are gradually change in a main scanning direction,
wherein a plurality of the light reception units are arranged along the main scanning direction, and
wherein the obtaining control operation comprises: applying light to the plurality of light reception units opposed to each of the steps from each of the plurality of light sources; and storing the light reception amount of each of the light reception units in the light reception amount storage unit for each of the plurality of light sources.

* * * * *